April 13, 1965 W. F. MITCHELL 3,177,963
VEHICLE SUSPENSION SYSTEM
Filed Feb. 7, 1963 3 Sheets-Sheet 1

Inventor:
Wallace F. Mitchell
Wupper, Gradolph & Love
Attorneys

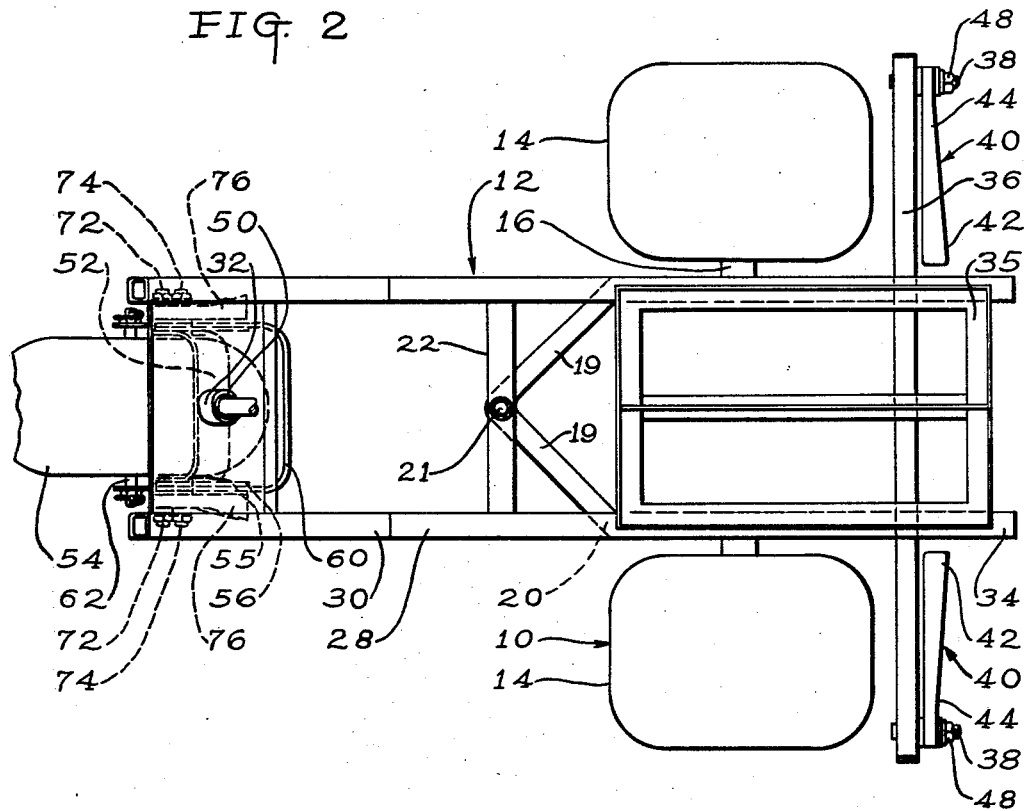
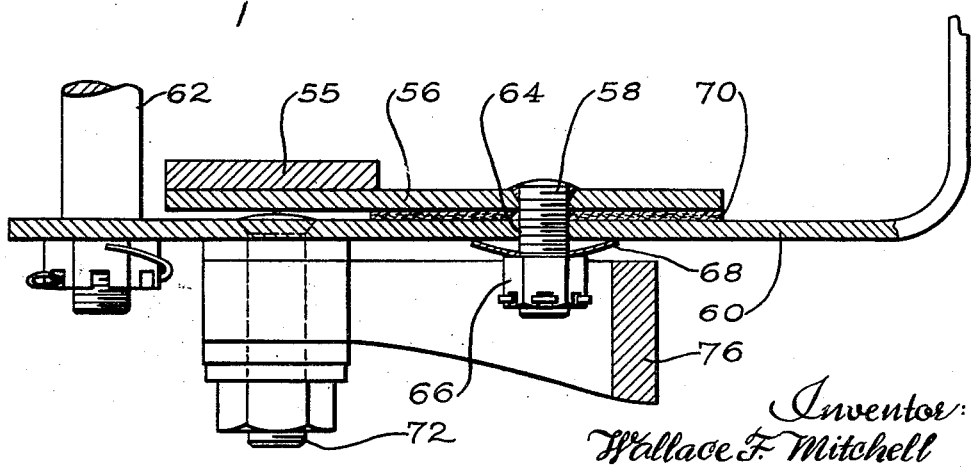

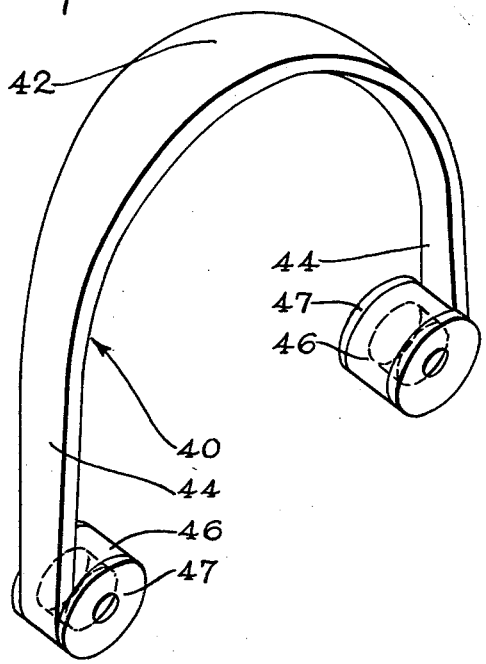
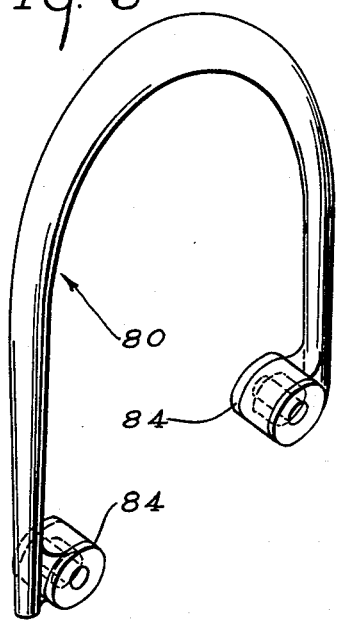
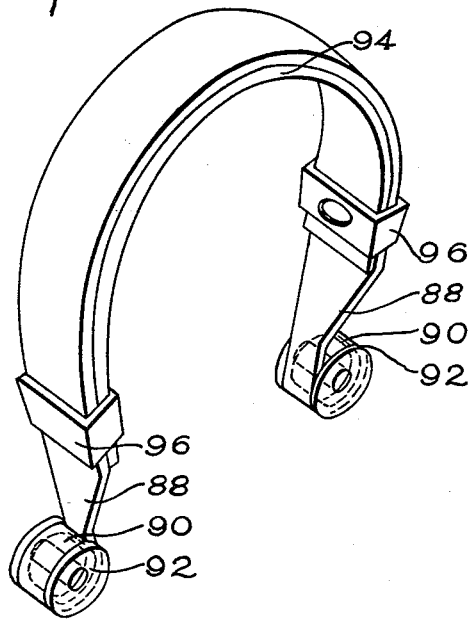
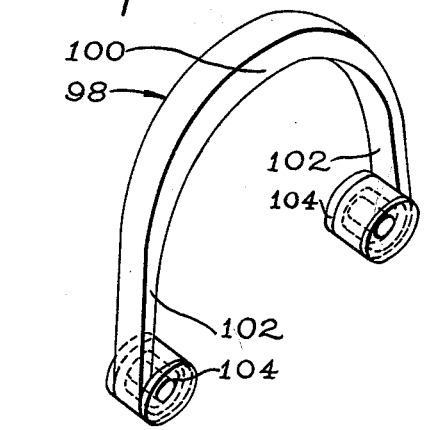

3,177,963
VEHICLE SUSPENSION SYSTEM
Wallace F. Mitchell, Arlington Heights, Ill., assignor to Victor Comptometer Corporation, Chicago, Ill., a corporation of Illinois
Filed Feb. 7, 1963, Ser. No. 256,950
8 Claims. (Cl. 180—27)

My invention relates generally to a suspension system for vehicles and in particular to a golf cart suspension system.

While golf carts have been widely used and extensively developed, their suspension systems have been far from satisfactory. A golf cart should be softly sprung, since it must frequently operate over relatively rough terrain. The wheels should have a fairly long throw for the same reason. On the other hand, it should be steady. A player enters a golf cart by stepping first on one of the side edges. Golf carts are relatively wide, and the weight of the person entering a cart therefore tends to tip the cart severely. A good suspension system will minimize any such tendency to tip. These considerations apply with equal force to other types of vehicles subject to conditions similar to those applicable to golf carts.

As a part of the remedy for tipping as well as for considerations generally of stability, it is desirable that the cart be supported as much as possible at its outermost corners. In a tricycle type cart, not much can be done about the single front wheel, but supporting the outermost corners over the spaced rear wheels will contribute to stability in spite of off-center loads.

A suspension system also should be inexpensive and simple, and yet adequate to meet these requirements of a soft ride, a high vertical wheel travel, and good level maintenance. All of these objects my suspension system achieves in remarkably successful fashion.

Another object of my invention may be considered the employment of a C-spring in a novel context and of novel configuration.

Still another object may be considered to be the provision of a novel shock absorbing mechanism for minimizing the rebound of the vehicle which is exceedingly effective, yet simple.

Other objects and advantages of my invention will be apparent from the following description and drawings of which:

FIG. 2 is a top plan view thereof;

FIG. 4 is a section taken substantially along the line 4—4 of FIG. 1 looking in the direction of the arrows;

FIG. 5 is an enlarged perspective view of the form of C-spring shown in FIGS. 1 to 3;

FIG. 6 is a similar view of a second form;

FIG. 7 is a similar view of a third form; and

FIG. 8 is a similar view of a fourth form.

Figure 1:
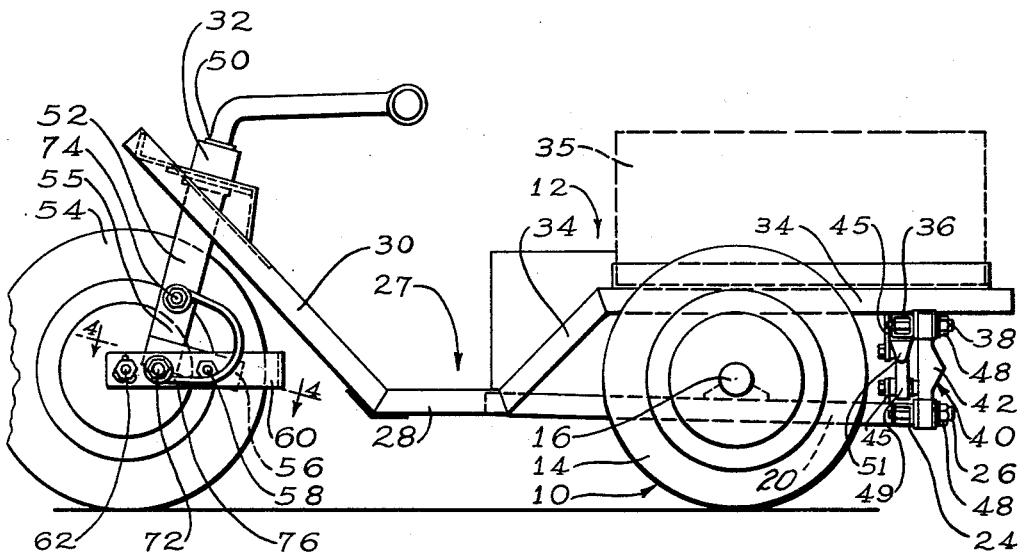
FIG. 1 is a side elevation of a golf cart shown somewhat diagrammatically in those parts not relevant to this invention incorporating an embodiment of my suspension system.
Figure 3:
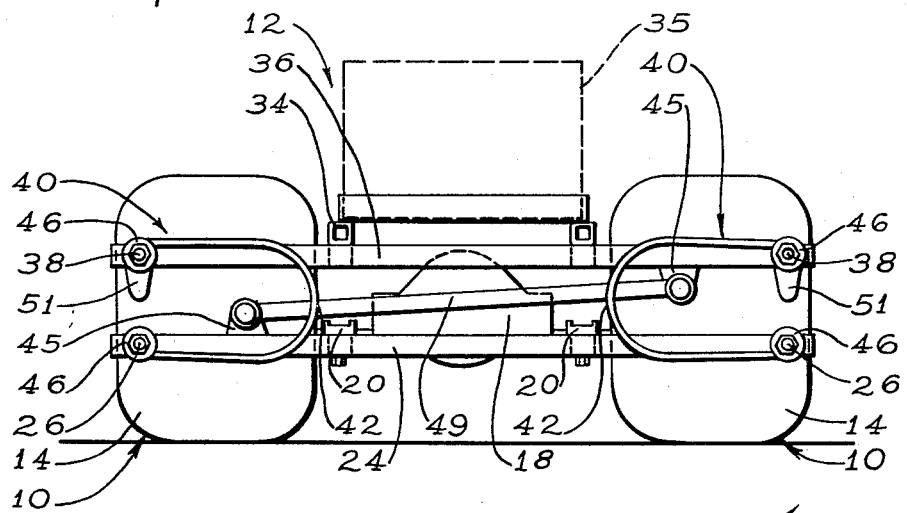
FIG. 3 is a rear elevation.

In FIGS. 1 through 3 is shown a representative golf cart having an unsprung rear wheel assembly 10 and a sprung chassis 12. The rear wheel assembly includes the wheels 14, an axle 16, a differential 18, and a motor (not shown). A pair of rails 20 are secured to the axle housings and extend fore and aft of the wheels 14. The rails may be joined together at their forward ends as at 19 to define an A frame which is secured at its apex 21 to a cross member 22 of the chassis in conventional fashion for limited angular movement (FIG. 2). At their rear ends a transverse beam 24 is secured thereto to extend the width of the cart back of the wheels 14. Threaded spring studs 26 extend horizontally rearward from the beam 24 adjacent its ends.

The chassis includes a frame 27 have a low-slung central portion 28 between the front and rear wheels, a portion 30 sloping up therefrom to the front and mounting a steering head 32, and a portion 34 extending upwardly and then rearwardly from the rear portion thereof. The low-slung portion 28 is decked over and provides for easy access into the cart. The portion 34 carries the body 35 which provides seats, golf bag pockets, and a housing for the batteries. As the body is conventional, detailed illustration and description is believed unnecessary. A transverse beam 36 is secured against the under side of the rear portion 34 of the chassis frame 27 above beam 24 of the wheel assembly. Beam 36 likewise has rearwardly extending bolts 38 secured thereto in vertical alignment with the bolts 26 of beam 24.

The rear C-springs 40, of FIGS. 1 through 3, are shown in greater detail in FIG. 5. They are formed of metal of uniform thickness with a double taper on one edge so as to provide a central portion 42 of greater width and therefore greater stiffness, and end portions 44 of greater flexibility. The end portions are inwardly rolled to provide eyes 46 which may contain thimbles 47. The springs are mounted, as best seen in FIG. 3, on the bolts 26 of the wheel assembly beam 24 and bolts 38 of the chassis beam 36 and secured thereto by nuts 48. The springs are oriented transversely of the cart with the bights or central portions 42 facing inwardly and the spring ends or the support points as between the wheel assembly and the chassis at the outermost corners thereof. The single sided double bevel permits the springs to lie close against the beams 24 and 36 and still provides the wanted increased stiffness in the bight area of the spring.

A pair of brackets 45 are secured, one to the top side of beam 24 adjacent its left end and the other to the under side of beam 36 adjacent its right end, and a stabilizer bar 49 extends therebetween to control side-to-side sway of the chassis relative to the wheel assembly. Overload bumpers 51 are also secured to the under side of beam 36 to prevent excessive flexure of the C-springs.

As stated before, the steering head 32 extends forwardly and downwardly through the forward portion of the frame 27. The steering column 50 extends through the head 32 and terminates at its lower end in a fork 52 which embraces the front wheel 54, the arms 55 thereof extending down on each side to a position slightly to the rear of the center of the wheel. A pair of flat fork arm pivot plates 56 are welded at right angles to the ends of the fork-arms to extend rearwardly therefrom. The plates 56 have outwardly extending studs 58 secured to their rear ends. A U-shaped rocker bracket 60 extends around rearwardly of the wheel 54 and mounts the wheel axle 62 between the forward ends of its open arms. Rearwardly of the axle 62 the rocker bracket is bored, as at 64, to receive the studs 58. A nut 66 and a spring washer 68 or other means of tensioning snubbing means are mounted on the studs 58. A ring or washer 70 of asbestos or some comparable braking material is interposed on studs 58 between the fork arms 56 and the arm of the rocker bracket 60.

A spring bolt 72 is mounted to each arm of the rocker bracket to extend outwardly therefrom between the axle 62 and the stud 58. Another spring bolt 74 is mounted to each side of the fork 52 above the pivot plates 56. A C-spring 76 is mounted on each side of the wheel between the spring bolts 72 and 74. These springs may be formed in the same fashion as the rear springs 40 with a single sided doubled bevel, or may be formed like any of the other springs to be later described.

It will be appreciated that the pivotal connection for spring action between the front wheel and the chassis occurs at the studs 58. The front springs 76 establish a normal angular relation of the rocker bracket 60 and the pivot plates 56, but the angular relation will change as the front wheel hits a bump or a hole.

The front end of the cart is exceedingly light, and the front wheel assembly is relatively heavy. Since the ratio of sprung to unsprung weight at the front end of the cart is low, the front end will bounce severely. It is to this end that the shock absorber or spring damper represented by the asbestos washer 70 and the spring washer 68 is provided. By these members an adjustable amount of friction can be obtained on the studs 58 between the pivot plates 56 and the rocker bracket 60 so as to restrain the spring action and avoid annoying bouncing after a hole, for instance, has been hit with the front wheel.

C-springs have been employed to support and cushion loads of various kinds, but those with which I am familiar have involved an immobilization or tying down of one arm so that the load is carried entirely by the other arm and the bight. Likewise, in such applications as I have seen, the arms have been about the same in cross section as the bight thereof. In applying such a spring to a vehicle suspension system, I have found that a spring which will provide a soft enough ride will break readily across the bight, and a spring which will not break results in a too stiff springing. To meet this difficulty I have devised the springs illustrated in FIGS. 6, 7, and 8, as well as that already described and particularly shown in FIG. 5. All of these springs are characterized by a heavier cross section in the area of the bight than in the area of the arms or ends. I conclude from the nature of spring failures that I have encountered that the greatest strain on the spring occurs in the area of the bight, and I have therefore enlarged its section. On the other hand, there is resilient potential in the ends of the spring which is inadequately developed when a spring of uniform cross section is employed.

In FIG. 6 I show a spring 80 which may be formed of cylindrical stock with a long convergent taper at its ends. Bearing sleeves or thimbles 84 will be welded to the insides of the extremities thereof.

In FIG. 7 I show a double leaf C-spring. The outer leaf is of uniform thickness and width through the bight area, but tapers as at 88 toward its ends. Again, the taper is on one side of the leaf only so as to permit the spring to lie flat against the spring mounting structure. In this instance the extremities of the outer leaf are curled outwardly away from each other as at 90 to enclose thimbles 92. An inner leaf 94 of uniform width and thickness is contained within the outer leaf and lies against it in the area of the bight but stops short of the tapered ends of the outer leaf. The inner leaf will be secured to the outer leaf as by conventional shackles 96.

FIG. 8 shows a spring 98 of variable thickness. The bight 100 is thick, but the thickness diminishes toward the ends 102. Again, the extremities are curled inwardly to contain a thimble 104.

It will be appreciated from the foregoing description that I have devised a novel suspension system for golf carts which possesses substantial advantages over those presently known. The cart is supported at the outermost available corners so as to give the cart a high measure of stability. This should be contrasted with the springing provision currently employed of a single leaf spring supporting the rear end of a cart and having only a single central point of attachment either to the chassis or to the rear wheel assembly, or both.

This high degree of stability is derived from the use of the C-spring. If leaf springs were employed (even two at the outer corners) there would be a substantial projection of the springs beyond either the rear or the sides of the cart. This would be unsightly, a natural hazard to a player's shins and an unhandy addition to either the cart's width or length.

Attention is likewise directed to the C-springs mounted to be free on each arm thereof. There is greater resilience and possible travel with a spring of given length. I have found that shackling down one arm of a C-spring seems to contribute materially to the possibility of breakage. The free mounting thereof will permit a natural and intended flexing of the spring regardless of the exact vertical alignment of the mounting bolts as compared with the rolling strain imposed on such a spring when one arm is shackled down.

Finally, I wish to call attention to the shock absorbing mechanism in the front end of the cart. The front end is light; bouncing is a serious problem. My novel incorporation of the adjustable frictional damping provides excellent control of this problem.

It will be appreciated that I have described an embodiment only of my invention and that many alternatives in the practice thereof will suggest themselves to those familiar with golf cart design. I therefore desire that my invention be regarded as being limited only as set forth in the following claims.

I claim:

1. A front wheel suspension for a tricycle-type golf cart including a generally vertical steering column and a single front wheel having an axle; a generally horizontal member mounting said axle adjacent its front end, means pivotally mounting said horizontal member to said column to the rear of said axle, a spring spindle on said member forward of said pivotal mounting means, a second spring spindle on said column generally vertically above said first spindle, and a C-spring pivotally mounted at its ends to said spindles.

2. The combination as set forth in claim 1 including additionally a friction braking member on said pivotal mounting means between said member and said column and means for adjustably varying the pressure of said member and said column against said braking member.

3. A C-shaped spring formed of a single leaf of spring steel of uniform thickness, said leaf having a double taper on one edge only thereof to provide a bight of a first cross sectional area and ends of less cross sectional area, said ends having spring spindle bearings secured thereto.

4. A suspension system for an automotive vehicle including an unsprung wheel assembly having two transversely aligned wheels and a sprung chassis comprising two C-springs, each having a bight and two ends formed of a single leaf of spring steel of uniform thickness, said leaf having a double taper on one edge only thereof to provide a bight of a first cross sectional area and ends of less cross sectional area, means pivotally attaching one end of said springs to said wheel assembly and means pivotally securing the other end of said springs to said chassis at points above said assembly-attached ends.

5. A tricycle type golf cart including a steerable wheel and a pair of transversely aligned driving wheels comprising a chassis, an unsprung wheel assembly transversely connected at its forward end to said chassis behind said steerable wheel mounting said driving wheels, a pair of C-springs, each having a bight and two ends, means pivotally securing one end of each of said springs to said chassis and means pivotally securing the other end of each of said springs to said wheel assembly below said one end to support the portion of said chassis over said driven wheels in spaced, sprung relation thereto and means for springing said chassis with respect to said steerable wheel, said means comprising a generally vertical rotatable steering column mounted to said chassis, an axle for said wheel, a generally horizontal member mounting said axle adjacent its front end, means pivotally mounting said horizontal member to said column to the rear of said axle, a spring spindle on said member forward of said pivotal mounting means, a second spring spindle on said column generally vertically above said first spindle, and a C-spring pivotally mounted at its ends to said spindles.

6. The combination as set forth in claim 5 including additionally a friction braking member on said pivotal mounting means between said member and said column and means for adjustably varying the pressure of said member and said column against said braking member.

7. The combination as set forth in claim 5 wherein said C-springs have a bight of a greater cross sectional area and end portions of a less cross sectional area.

8. A suspension system for a golf cart having two transversely aligned, spaced rear wheels, said cart including an unsprung wheel assembly incorporating said wheels and a sprung chassis having side edges adjacent said wheels; comprising a pair of C-springs having two ends and a bight, means on said chassis pivotally supporting one end of each spring closely adjacent each side thereof and means pivotally supporting the other end of said springs on said assembly generally directly under said one end, said springs being oriented in the same vertical plane with the bights thereof extending toward each other, and a side sway stabilizer interconnecting said assembly and said chassis in a plane parallel to and adjacent said plane of said springs.

References Cited by the Examiner
UNITED STATES PATENTS

| | | | |
|---|---|---|---|
| 99,558 | 2/70 | Goller | 267—47 |
| 100,626 | 3/70 | Henry | 267—47 |
| 441,417 | 11/90 | Jeffrey | 280—277 |
| 443,815 | 12/90 | Bolte | 280—277 |
| 1,185,378 | 5/16 | Crawford | 267—54 |
| 1,219,259 | 3/17 | Crawford | 267—54 |
| 1,250,332 | 12/17 | McCloud | 267—47 |
| 1,309,305 | 7/19 | Scheiner | 180—27 |
| 2,182,249 | 12/39 | Chayne | 180—73 |
| 2,191,528 | 2/40 | Hewel | 267—54 |
| 2,480,526 | 8/49 | Voltz | 280—124 |
| 2,498,976 | 2/50 | Wittman | 267—41 |
| 2,525,171 | 10/50 | Franks | 280—277 |
| 2,533,511 | 12/50 | Rowland et al. | 267—47 |
| 2,608,752 | 9/52 | Schilling | 267—47 X |
| 2,848,251 | 8/58 | Stoll | 280—277 |
| 2,849,226 | 8/58 | Maruhn | 267—47 |
| 2,934,334 | 4/60 | Davis | 267—19 |
| 2,955,842 | 10/60 | Stump | 280—124 |
| 2,973,048 | 2/61 | Jensen | 180—27 |
| 3,079,139 | 2/63 | Greene et al. | 267—41 |

FOREIGN PATENTS

| | | |
|---|---|---|
| 566,148 | 11/23 | France. |
| 640,565 | 4/28 | France. |
| 197,917 | 4/08 | Germany. |

MILTON BUCHLER, *Primary Examiner.*

A. HARRY LEVY, KENNETH H. BETTS, *Examiners.*